United States Patent [19]
Lucas et al.

[11] 3,765,260
[45] Oct. 16, 1973

[54] LOAD LIMITING MECHANISM

[75] Inventors: Anthony A. Lucas, Philadelphia, Pa.; Frank T. Pisano, Voorhees, N.J.

[73] Assignee: The United States of America as represented by the Secretary of the Army, Washington, D.C.

[22] Filed: Sept. 1, 1972

[21] Appl. No.: 285,790

[52] U.S. Cl.................. 74/405, 74/424.8 R, 74/425
[51] Int. Cl....... F16h 57/00, F16h 1/18, F16h 1/16
[58] Field of Search...................... 74/405, 424.8 R, 74/425

[56] References Cited
UNITED STATES PATENTS
3,559,499  2/1971  Profet ........................... 74/424.8 R

*Primary Examiner*—Leonard H. Gerin
*Attorney*—Harry M. Saragovitz et al.

[57] ABSTRACT

A load limiting mechanism for an aircraft canopy actuator in which the gear transmission has an automatic decoupling arrangement to eliminate excessive force on the actuator when a predetermined load imposing closed canopy position has been reached. The power transmission includes a one-way drive connection for opening the canopy, and a second canopy closing drive connection which is disengaged or disconnected when the canopy has reached its closed position.

4 Claims, 4 Drawing Figures

LOAD LIMITING MECHANISM

The invention described herein may be manufactured, used, and licensed by or for the Government for governmental purposes without the payment to us of any royalty thereon.

This invention relates to mechanisms, and more particularly to an aircraft canopy actuating mechanism.

In existing aircraft canopy actuating mechanisms, the canopy, which opens and closes for occupant normal entry and exit and is blown off the aircraft for emergency escape operations, is actuated by an electric motor, gear transmission, a solenoid operated clutch and a rotary to linear mechanism consisting of a ball nut and screw. At the end of the closing operation, the canopy comes to a halt against the aircraft fuselage frame. The actuator will continue to operate and pulls down on the canopy until a load builds up. The load is sensed within the actuator to cut off the electrical current to a relay in the aircraft which in turn interrupts the current to the motor. A time lag exists between actuator switch shut-off and the arresting of the motor shaft, with a resulting excessive force beyond actuator capability causing high failure rates.

It is an object of the invention to provide a canopy actuator gear transmission arrangement in which such an excessive force is eliminated.

Another object of the invention is to provide such an arrangement in which a positive mechanical disconnection is caused within the gear transmission itself to assure the prevention of excessive force build-up in the event that electric current interruption fails to occur.

These and other objects, features and advantages will become more apparent from the following description and accompanying drawings in which.

Figure 1:
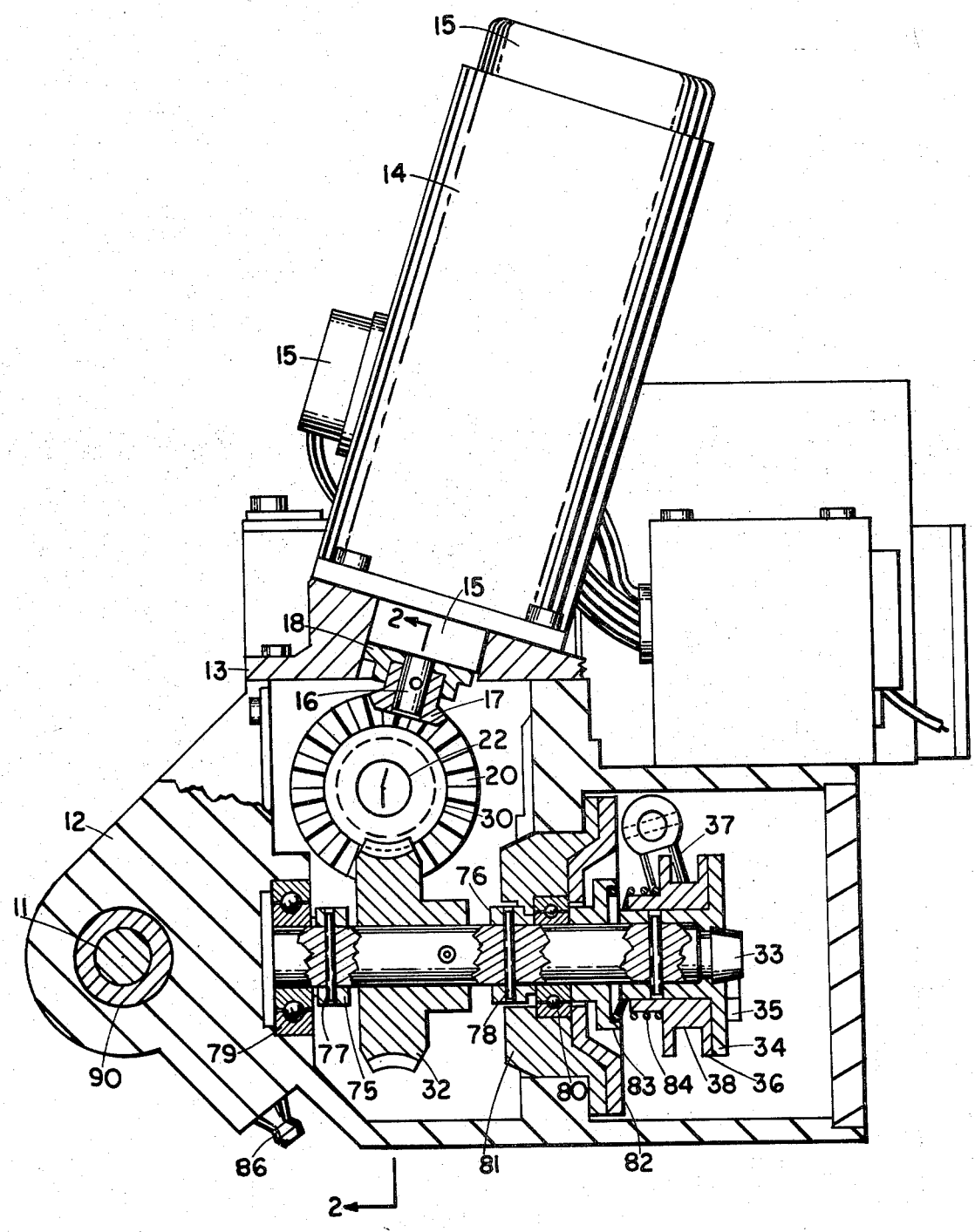
FIG. 1 is a sectional view of a preferred aircraft canopy actuator gear transmission and associated parts embodying the principles of the invention.
Figure 4:
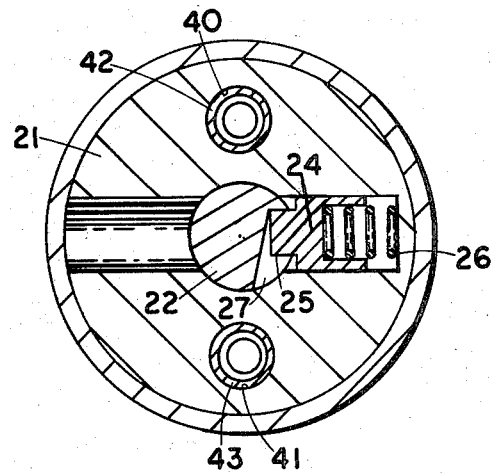
FIG. 4 is a sectional view taken along line 4—4 of FIG. 3.
Figure 2:
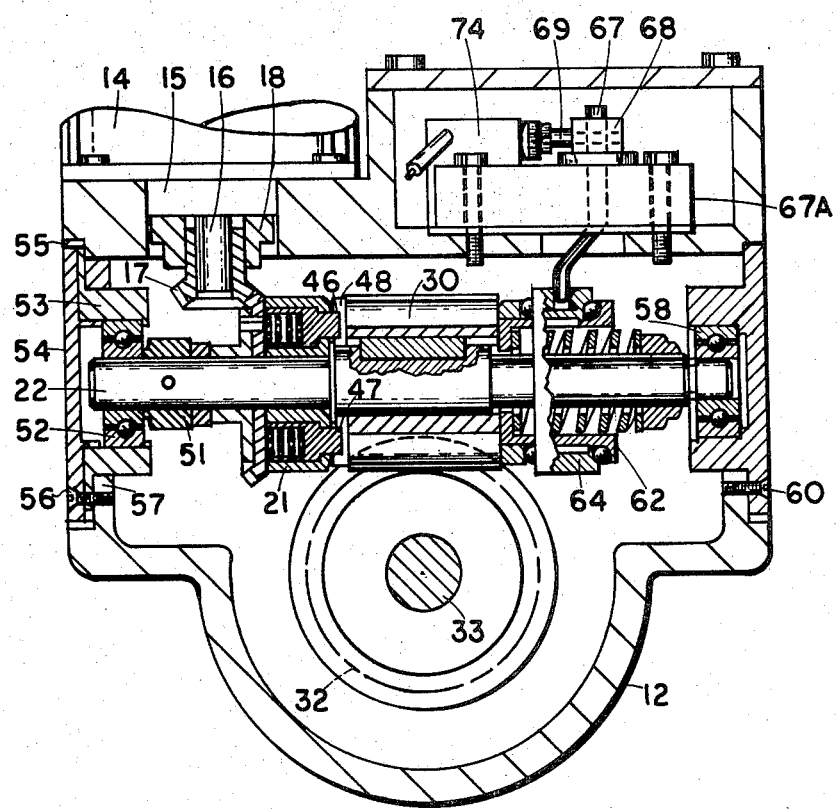
FIG. 2 is a sectional view taken along line 2—2 of FIG. 1.
Figure 3:
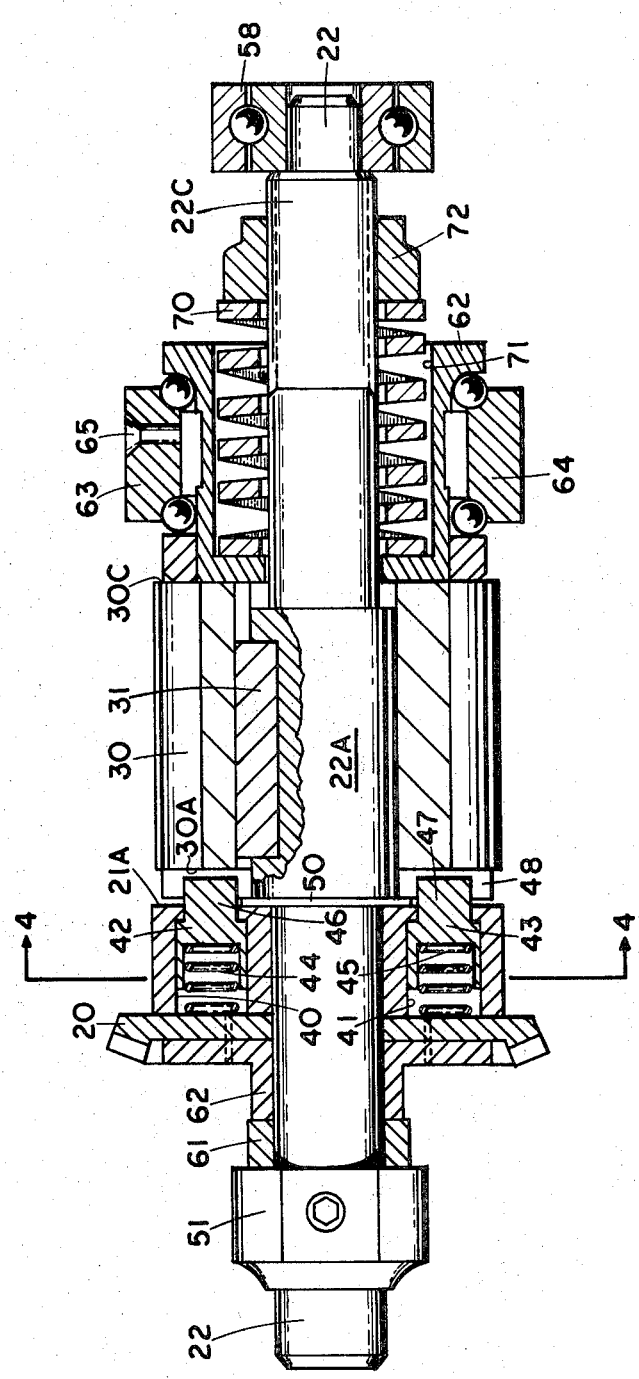
FIG. 3 is an enlarged view of a portion of the FIG. 2 arrangement.

Suitably mounted on an aircraft frame mounting pin 11 (FIG. 1) is a gear box casting 12, the cover 13 of which has secured thereto the support bracket 14 of reversible electric motor 15. The motor shaft 16 has bevel pinion 17 (FIGS. 1, 2) appropriately secured for rotation therewith relative to a suitable bushing and seal arrangement 18. Bevel gear 20 and an annular retainer 21 (FIGS. 2, 3, 4) suitably secured thereto are mounted on transmission shaft 22 for driving it all in a manner to be described.

Retainer 21 has a one-way drive connection with shaft 22 in that upon assembly the spring biased detent 24 (FIG. 4), carried by and extending transversely of the retainer 21, has a reduced tip portion 25 that is biased by spring 26 into engagement in the transversely slotted recess 27 that extends partially across the shaft 22. When the retainer 21 is rotated counter-clockwise by motor 15, the detent protuberance 25 turns the shaft 22 counter-clockwise along with the retainer 21. Worm gear 30, having an internal longitudinal keyway for key 31 (FIG. 3) extending radially outward from the enlarged central portion 22A of shaft 22, thus will rotate counter-clockwise (FIG. 1) to turn the worm wheel 32 (FIG. 2) clockwise along with canopy actuating shaft 33 (FIGS. 1, 2) and clutch driving plate 34. Plate 34 and an upper clutch (not shown) are appropriately apertured to receive the upwardly extending tang 35 of lower clutch 36 that is operated by a suitable clutch fork 37 engaging in peripheral groove 38 of lower clutch 36. As in existing aircraft canopy actuating mechanisms, the upper clutch is connected to an appropriate ball nut and screw to actuate the canopy (not shown) toward an open condition.

When the motor 15 is reversed to impart clockwise (FIG. 4) motion to retainer 21, detent 24 has the tendency to move along the base of slot 27 prior to being cammed out of the slot and compressing spring 26. Thus, detent 24 affords only a one-way drive connection between the retainer and shaft 22. However, in order to obtain canopy closing actuation, a separate drive connection is provided between the retainer 21 and the worm gear 30, whereby these parts and shafts 22 and 33 now operate in the opposite direction. Retainer 21 has a pair of diametrically opposed rearwardly opening recesses 40, 41 in which are slidably mounted respective cylindrical detent members 42, 43 that are substantially similar to detent 24. Compression springs 44, 45 seat in the corresponding rearwardly opening recess of detents 42, 43 and abut the forward surface of bevel gear 20 to urge the detent reduced tip portions 46, 47 forwardly through mating openings in the forward wall 21A (FIG. 3) of the retainer for engagement in the transversely extending slot 48 provided across the rearward end wall of worm gear 30. Thus, with motor 15 turning bevel gear 20 clockwise (FIG. 1), the normal driving engagement of retainer detents 42, 43 in worm gear slot 48 will impart similar clockwise motion to worm gear 30 and shaft 22, the worm gear 30 thereby turning worm wheel 32 and shaft 33 counter-clockwise (FIG. 2) to actuate the canopy toward a closed condition.

Transmission shaft 22 has a radially outwardly extending shoulder 50 (FIG. 3) that is positioned between the adjacent end surface portions 21A and 30A of the retainer and worm gear. Upon assembly the corresponding end surfaces 21A and 30A of the retainer and worm gear are in abutting relationship with opposite faces of shoulder 50. Bearing stop 51 has a suitable set screw for securing the stop on shaft 22 in position to abut the inner bearing forward face of ball bearing 52 (FIG. 2), the outer bearing portion being suitably secured in ball bearing housing 53 which along with its retainer 54 is secured in the gear box casting recess 55 preferably by three screws 56 threadedly engaged in appropriate openings provided in the inwardly extending annular flange 57. The forward end of shaft 22 is similarly mounted in ball bearing 58, the retainer 59 for which is similarly secured by three screws 60. The spacer 61 (FIG. 3) has a predetermined length that when positioned between the stop 51 and bevel gear hub 62, retainer 21 abuts shaft shoulder 50.

The forward face 30C of worm gear 30 is normally abutted by the rearward surface of the inner race portion 62 of bearing assembly 63, the outer race 64 having a peripheral opening 65 for insertion of a torque limit shaft 67 (FIG. 2) which is suitably journalled in mounting 67A and connected through lever arm 68 to adjusting screw 69. When the compression spring 70 (FIGS. 2, 3), which biases bearing assembly 63 and worm gear 30 rearwardly and surrounds shaft 22 when held substantially within the inner race forwardly opening internal recess 71 by a self locking nut 72 positioned on a predeterminedly threaded portion 22C of shaft 22, is compressed by forward translation of the rotating worm gear 30 and bearing assembly 63 relative to arrestment of worm wheel clockwise motion after a predetermined load imposing closed canopy condition has been attained, the drive connection between the retainer detents 42, 43 and the worm gear slot 48 will immediately disengage, well before adjusting screw 69 can be rotated by torque limit shaft 67 away from switch 74 to interrupt the electric current to a relay (not shown) in the aircraft. The relay in turn disconnects the motor 15 from its electrical source and the braking action of the motor will arrest motion of its shaft 16, the bevel pinion and gear, and retainer 21.

When the worm gear 30 and shaft 22 terminate rotation, the compressed spring 70 exerts a force through worm gear and worm wheel 32 upon the previously stopped shaft 33 to assist in holding the canopy in a closed position until a manual locking securement thereof can be accomplished. Subsequently, the clutch fork 37 is operated to disengage the clutch mechanism and free the various mechanical elements for return to their original positions for subsequent operation.

Worm wheel 32 is predeterminedly mounted on shaft 33 by a suitable set screw or the like, between a pair of longitudinally spaced positioning rings 75, 76 (FIG. 1) which are secured to shaft 33 by respective press-fitting pins 77, 78. The shaft 33 is appropriately mounted on ball bearings 79, 80, the housing 81 for the latter having its retainer 82 centrally apertured to receive the retainer 83 for the spring 84 of the lower clutch 36. A grease fitting 86 has a suitable fluid communication with the mounting bearing 90 for the aircraft frame mounting pin 11.

Various modifications, changes or alterations may be resorted to without departing from the scope of the invention as defined in the appended claims.

We claim:

1. A load limiting mechanism for a canopy actuating arrangement, comprising
    a reversible electric motor having a driving shaft,
    a bevel pinion secured to said motor shaft,
    a transmission shaft carrying a bevel gear driven by said pinion, an annular retainer, a worm gear longitudinally keyed thereto and having a transversely slotted end wall, and a bearing assembly having an inner race housing at least one end of a compression spring, said retainer being secured to said bevel gear and having a one-way drive connection with said transmission shaft to rotate same in a first direction, said retainer having spring biased detent means for engaging said slotted end walls to rotate said worm gear and transmission shaft in a second direction,
    a self locking nut threadedly mounted on said transmission shaft and having a transverse surface for abutting said spring,
    a worm wheel mounted on a canopy actuating shaft and drivingly connected with said worm gear,
    so constructed and arranged that when said worm gear, rotating in said second direction, drives said worm wheel beyond a predetermined load imposing closed canopy position, said worm gear will advance along said transmission shaft to compress said spring and disengage the drive connection between said detent means and said worm gear slotted end wall.

2. The structure in accordance with claim 1 wherein said transmission shaft has a radially outwardly extending shoulder positioned intermediate end surface portions of said retainer and worm gear, said compression spring urging said inner race rearwardly against said worm gear and said worm gear against said shoulder, and a stop nut on said transmission shaft rearward of said bevel gear for positioning said retainer forwardly against said shoulder.

3. The structure of claim 2 wherein said spring biased detent means includes a pair of cylindrical detents extending longitudinally through respective diametrically opposed openings in a forward wall of said retainer, each detent having an enlarged surface within said retainer and a rearwardly opening recess, and a compression spring seated in each of said detent recesses and in abutment with a forward surface of said bevel gear.

4. The structure of claim 1 wherein said one-way drive connection includes a transversely slotted recess extending partially across said transmission shaft, and a spring biased detent carried by and extending transversely of said retainer for engagement in said shaft recess when aligned therewith.

* * * * *